(12) United States Patent
Kitamura (10) Patent No.: US 7,525,204 B2
(45) Date of Patent: Apr. 28, 2009

(54) METHOD AND APPARATUS FOR BOOSTING POWER IN A BICYCLE ELECTRICAL DEVICE

(75) Inventor: Satoshi Kitamura, Kitakatsuragi-gun (JP)

(73) Assignee: Shimano Inc., Osaka (JP)

( * ) Notice: Subject to any disclaimer, the term of this patent is extended or adjusted under 35 U.S.C. 154(b) by 355 days.

(21) Appl. No.: 11/624,926

(22) Filed: Jan. 19, 2007

(65) Prior Publication Data

US 2008/0174210 A1  Jul. 24, 2008

(51) Int. Cl.
*F02B 63/04* (2006.01)
(52) U.S. Cl. .................. 290/1 R; 180/205; 180/206
(58) Field of Classification Search .............. 290/1 R; 180/205, 206
See application file for complete search history.

(56) References Cited

U.S. PATENT DOCUMENTS

| 3,969,649 | A | 7/1976 | Jacob |
| 5,857,762 | A | 1/1999 | Schwaller |
| 5,932,943 | A | 8/1999 | Werner et al. |
| 6,646,400 | B2 | 11/2003 | Uno |
| 6,717,280 | B1* | 4/2004 | Bienville ............... 290/1 R |
| 6,987,327 | B1* | 1/2006 | Lucatero ............... 290/1 A |
| 7,408,266 | B2* | 8/2008 | Yeh ............... 290/1 C |
| 2006/0202575 | A1 | 9/2006 | Itoi et al. |
| 2006/0232988 | A1 | 10/2006 | Wang et al. |

FOREIGN PATENT DOCUMENTS

| DE | 38 32 109 A1 | 3/1990 |
| DE | 94 20 459 U1 | 4/1995 |
| DE | 198 42 841 A1 | 7/1999 |
| EP | 0 075 373 A1 | 3/1983 |
| EP | 1 381 021 A2 | 1/2004 |
| EP | 1 475 298 A2 | 11/2004 |

OTHER PUBLICATIONS

Novac & Smith. *Fast Rising, Slow Decaying Magnetic Field Generator for Special Application in UK Industry*. Pulsed Power Plasma Science, 2001. IEEE Conference Record—Abstracts. Las Vegas, NV, USA.

* cited by examiner

*Primary Examiner*—Nicholas Ponomarenko
*Assistant Examiner*—Iraj A Mohandesi
(74) *Attorney, Agent, or Firm*—Global IP Counselors, LLP (57) ABSTRACT

A bicycle electric power device includes a dynamo, an electrical device, a power source and a switch. The electrical device is electrically connected to the dynamo. The power source is electrically connected to the dynamo in parallel with the electrical device and configured to chargeably connect to the dynamo. The switch is connected in series with the power source and configured to controllably connect the power source to the dynamo with the dynamo producing no power of its own such that with the switch closed the dynamo is charged by the power source and with the switch opened the dynamo provides boosted voltage to the bicycle electrical device.

12 Claims, 6 Drawing Sheets

METHOD AND APPARATUS FOR BOOSTING POWER IN A BICYCLE ELECTRICAL DEVICE

BACKGROUND OF THE INVENTION

1. Field of the Invention

This invention generally relates to a method and apparatus for boosting voltage using a bicycle dynamo. More specifically, the present invention relates to an apparatus that boosts voltage using the coil of a dynamo to increase voltage from a direct current power source.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front light and electrical system.

Recently, light-emitting diodes have been introduced as a light source for bicycles in order to reduce the size and weight of bicycle lights. Such light-emitting diodes are light weight and provide adequate lighting when several diodes are combined to provide a single source of illumination. Bicycles are often equipped with a dynamo. The dynamo produces electricity while the bicycle is in motion and can produce sufficient voltage to power the diodes, but only when the bicycle is in motion. When the bicycle comes to a stop, a separate source of power is required to power the diodes. However, such light-emitting diodes require a minimum voltage level in order to illuminate. Typically, a battery with sufficient voltage to power diodes is undesirable for use on a bicycle due to the increased weigh on the bicycle. Similarly, circuitry such as a transformer can be provided to step-up the voltage from a small battery thus providing sufficient voltage to illuminate the diodes. However, such circuitry is undesirable because the circuitry also adds weight to the bicycle.

In view of the above, it will be apparent to those skilled in the art from this disclosure that there exists a need for an improved electrical power system that provides increased voltage from a power source such as a small battery but does not increase the weight of the bicycle. This invention addresses this need in the art as well as other needs, which will become apparent to those skilled in the art from this disclosure.

SUMMARY OF THE INVENTION

One object of the present invention is to increase the functionality of a bicycle lighting system without increasing the mass of the system.

Another object of the present invention is to boost voltage from a static power source such as a small battery using existing components of the bicycle to illuminate light-emitting diodes.

The foregoing objects can basically be attained by providing a bicycle electric power device with a dynamo, an electrical device, a power source and a switch. The electrical device is electrically connected to the dynamo. The power source is electrically connected to the dynamo in parallel with the electrical device and configured to chargeably connect to the dynamo. The switch is connected in series with the power source and configured to controllably connect the power source to the dynamo with the dynamo producing no power of its own such that with the switch closed the dynamo is charged by the power source and with the switch opened the dynamo provides boosted voltage to the bicycle electrical device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
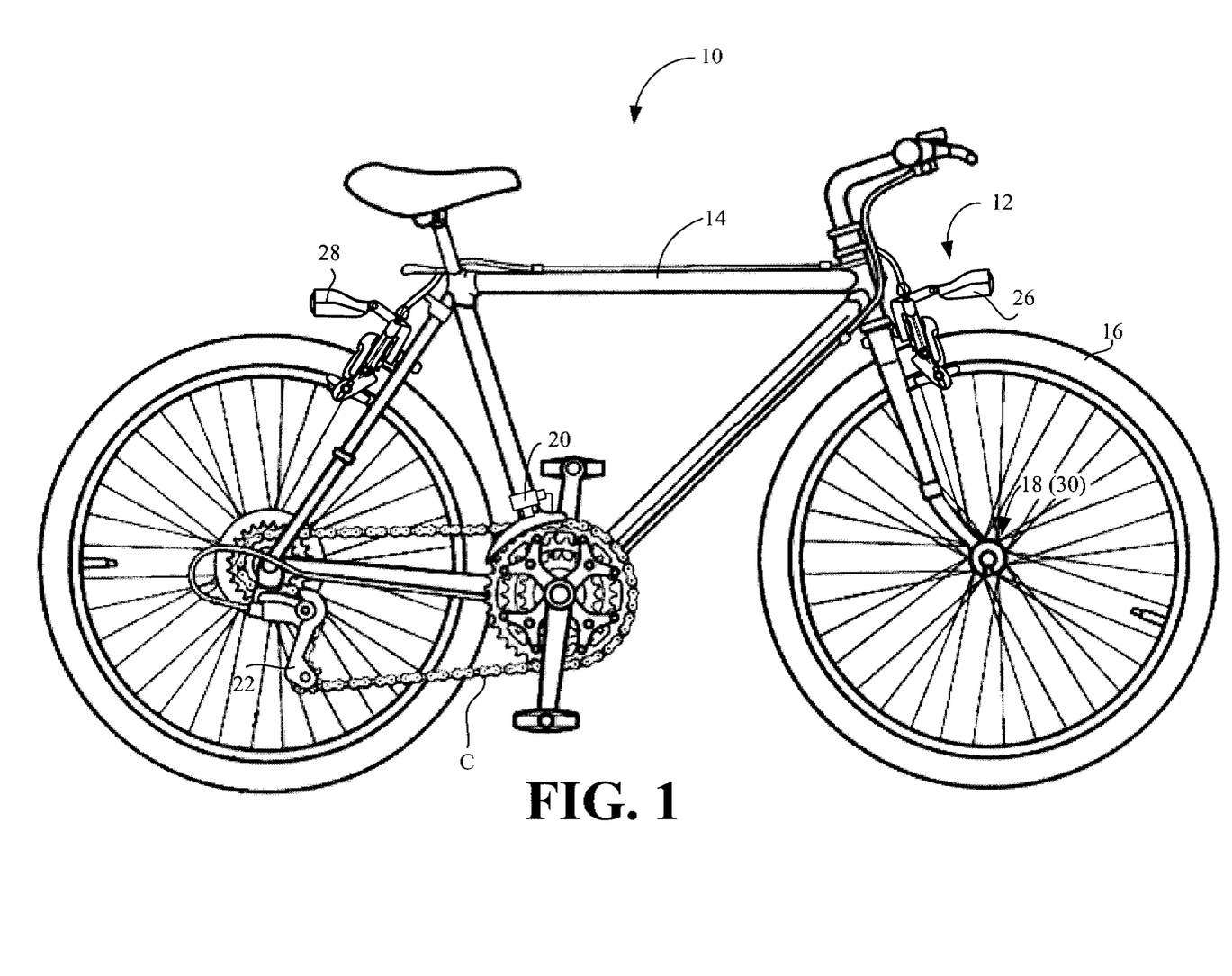
FIG. 1 is a side elevational view of a bicycle that includes an electric power device in accordance with the present invention.

Referring initially to FIG. 1, a bicycle 10 with an electric power device 12 is illustrated in accordance with a first embodiment of the present invention.

The bicycle 10 basically includes, among other components, a frame 14, a front wheel 16 that includes a hub 18, a front derailleur 20, a rear derailleur 22, a chain C, a front light 26, a rear light 28 and the electric power device 12. The electric power device 12 is configured to provide the front light 26 with voltage sufficient to cause the front light 26 to blink for several minutes when the bicycle 10 is not in motion, as described in greater detail below.

The frame 14 is a conventional bicycle frame that can be made of metal or a composite material. The hub 18 of the front wheel 16 preferably includes a dynamo 30 (see FIG. 2) that is configured to provide electrical power to the electric power device 12 when the bicycle 10 is in motion. Specifically, the hub 18, the front wheel 16 and the dynamo 30 are configured such that as the front wheel 16 rotates, direct current is generated by the dynamo 30 in a conventional manner. Hence, the dynamo 30 is coupled to the bicycle 10 and configured to provide electric power to the front light 26 (the electrical device) when the bicycle 10 is in motion. The direct current produced by the dynamo 30 can provide power to the front light 26 and/or the rear light 28.

The dynamo 30 further includes a conventional coil 32 that has a series of windings necessary for the process of generating electrical energy from the rotation of the front wheel 16. When the front wheel 16 is not rotating, the dynamo 30 produces no current and no voltage. However, in accordance with the present invention, the coil 32 can be used to provide sufficient voltage to power the front light 26 in a manner described in greater detail below. Specifically, when direct current (DC) at a first voltage is passed through the coil 32, the windings of the coil 32 form a magnetic field. When the direct current is cut off from the coil 32, the magnetic field collapses or dissipates. However, due to induction between the windings of the coil 32, the collapse or dissipation of the magnetic field produces direct current at a second voltage that is higher than the first voltage. The present invention takes advantage of this basic property of windings in a coil, as described in greater detail below.

The front derailleur 20 is a conventional mechanical bicycle component. Similarly, the rear derailleur 22 is a conventional mechanical bicycle component.

The front light 26 is preferably mounted to a front portion of the frame 14 as shown in FIG. 1. As shown in FIGS. 2-6, the front light 26 (the bicycle electrical device) includes a plurality of light-emitting diodes 40, a power source 46, a voltage detection circuit 48 and a switch 50. The diodes 40 are arranged in series to provide light in response to current flowing therethrough. Typically, such diodes 40 require approximately 3 volts per diode in order to illuminate. In the depicted embodiment, four individual light emitting diodes are connected in series with one another. Therefore, in order to illuminate the diodes 40, approximately 12 volts of direct current are required.

Figure 2:
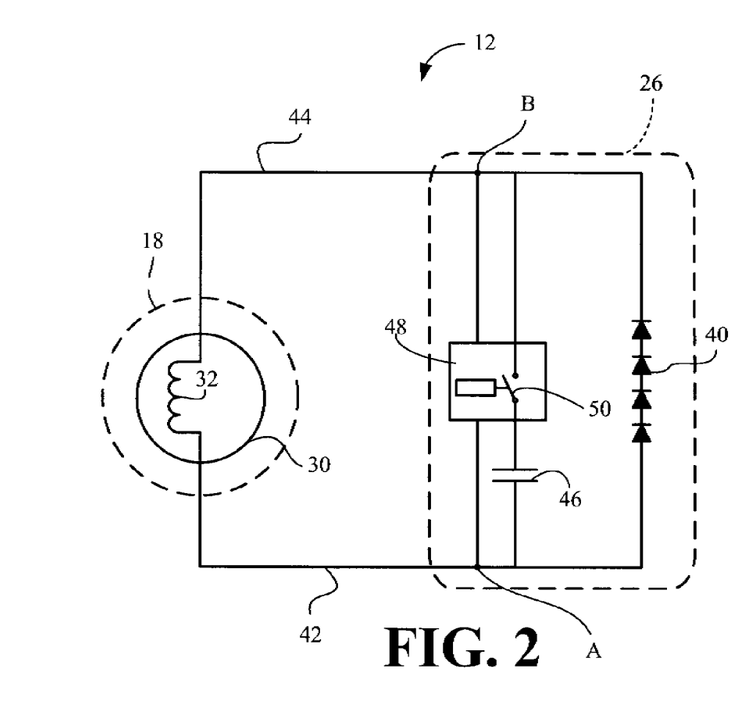
FIG. 2 is a schematic circuit diagram of the electric power device that includes a dynamo, a power source (a capacitor), a voltage detection circuit, a switch and light-emitting diodes, showing the switch in an open position in accordance with a first embodiment of the present invention.

As shown in FIG. 2, the electric power device 12 basically includes the dynamo 30, a line 42, a line 44 and the front light 26.

The line 42 electrically connects a first terminal (an output side) of the dynamo 30 to a negative terminal of the power source 46 and a first terminal of the diodes 40. The line 44 electrically connects a second terminal of the diodes 40 to a terminal of the switch 50 and a second terminal (an input side) of the dynamo 30.

As mentioned above, the negative terminal of the power source 46 is electrically connected to the line 42 and a positive terminal of the power source 46 is connected to a terminal of the switch 50. The power source 46 is basically an electrical power source that is electrically connected to the dynamo 30 in parallel with the diodes 40 (an electrical device). Further, the power source 46 is configured to chargeably connect to the dynamo 30 (and the coil 32). The switch 50 is electrically located between the power source 46 and the line 44. Therefore, the switch 50 controls the flow of electricity in and out of the power source 46. The power source 46 (a battery) can be a capacitor or a series of capacitors connected in parallel with one another that store electrical energy in a conventional manner. In a preferred embodiment, the power source 46 is a 1 Farad capacitor capable of storing electric energy and producing approximately 2.3 volts of electric potential for a short period of time when fully charged. Hence, the power source 46 is a battery that provides a first voltage of the electric power assembly 12 that is approximately 2.3 volts. The power source 46 is charged by the dynamo 30 when the bicycle 10 is in motion with the front wheel 16 rotating. Once the front wheel 16 stops rotating, the power source 46 provides power to operate the electric power assembly 12 and the diodes 40, as described below.

The voltage detection circuit 48 (a control circuit) includes circuitry that detects the potential between point A in the line 42 and point B in the line 44. The voltage detection circuit 48 also includes circuitry and/or a mechanical device that controls the switch 50. Specifically, the voltage detection circuit 48 is configured to open and close the switch 50 in response to detection of prescribed levels of voltage and/or current detected by the voltage detection circuit 48 between points A and B, which correspond to first and second sides of the dynamo 30. As is described further below, the switch 50 is connected in line with the power source 46.

The switch 50 is configured to controllably connect the power source 46 to the dynamo 30 with the dynamo 30 producing no power of its own. Specifically, with the switch 50 in a closed orientation the dynamo 30 is charged by the power source 46 and with the switch 50 in an open orientation the dynamo 50 provides boosted voltage to the diodes 40 (the electrical device).

With the bicycle 10 in motion, the front wheel 16 rotates and the dynamo 30 provides electric power to the diodes 40. Hence, when the bicycle 10 is in motion, the diodes 40 provide light to the front of the bicycle 10. When the bicycle 10 comes to a stop, the front wheel 16 stops rotating and power is no longer generated by the dynamo 30.

The electric power device 12 of the present invention is configured to operate as described below when the bicycle 10 is not in motion and the dynamo 30 is not generating power from rotation of the front wheel 16.

A description of the operation of the electric power device 12 is now provided with specific reference to FIGS. 2-6.

Figure 3:
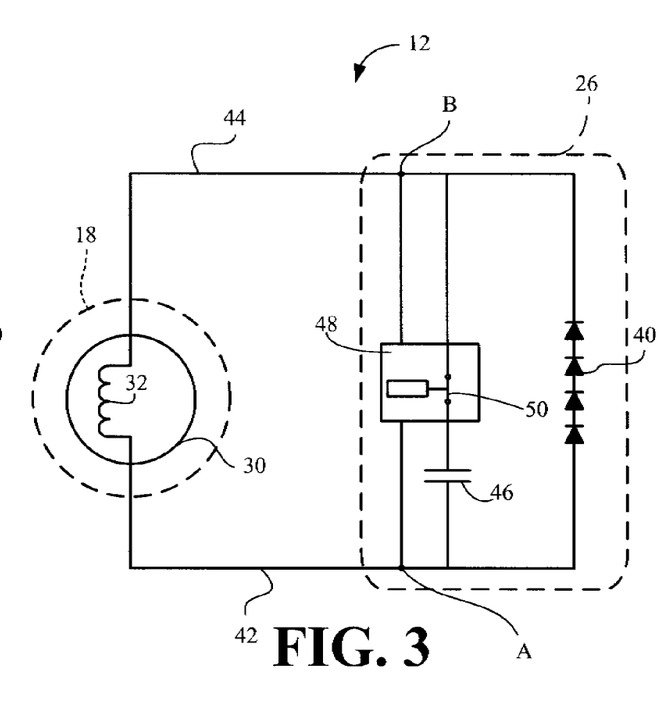
FIG. 3 is a schematic circuit diagram of the electric power device similar to FIG. 2 showing the voltage detection circuit closing the switch in accordance with the first embodiment of the present invention.

As shown in FIG. 2, when the bicycle 10 comes to a stop, the dynamo 30 stops producing electricity since the front wheel 16 is no longer rotating. As indicated in FIG. 3, the voltage detection circuit 48 detects the drop in voltage/current between the points A and B and closes the switch 50. With the switch 50 closed, direct current from the power source 46 is now provided to the dynamo 30.

Figure 4:
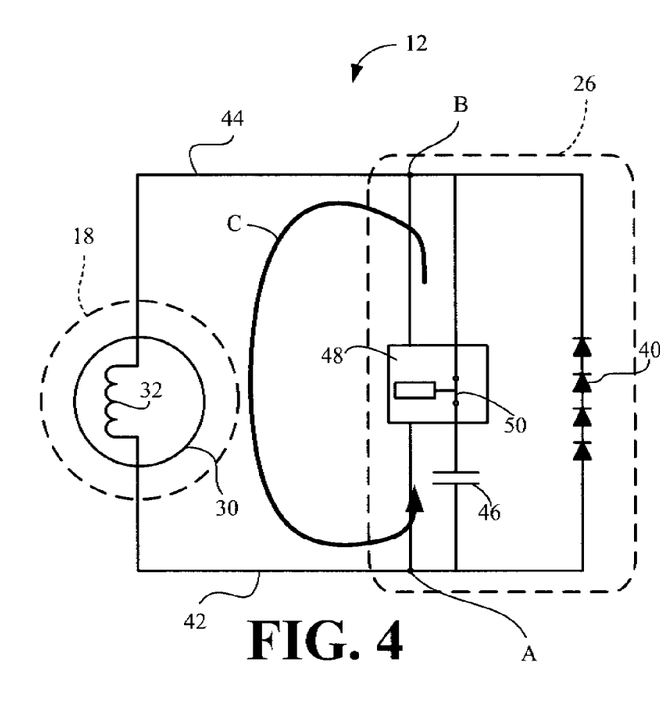
FIG. 4 is a schematic circuit diagram of the electric power device similar to FIGS. 2 and 3 showing the switch in the closed position allowing the power source to charge a coil of the dynamo in accordance with the first embodiment of the present invention.
Figure 5:
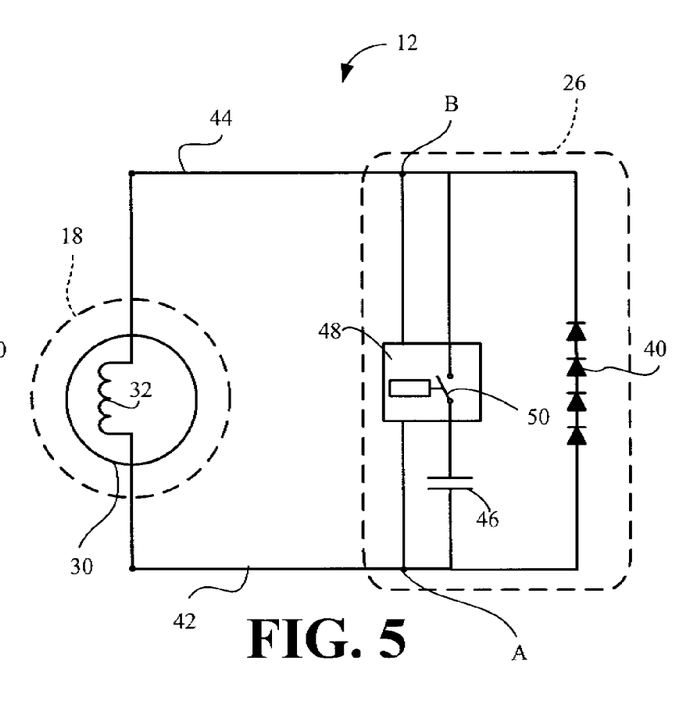
FIG. 5 is a schematic circuit diagram of the electric power device similar to FIGS. 2, 3 and 4 showing the voltage detection circuit opening the switch in accordance with the first embodiment of the present invention.
Figure 6:
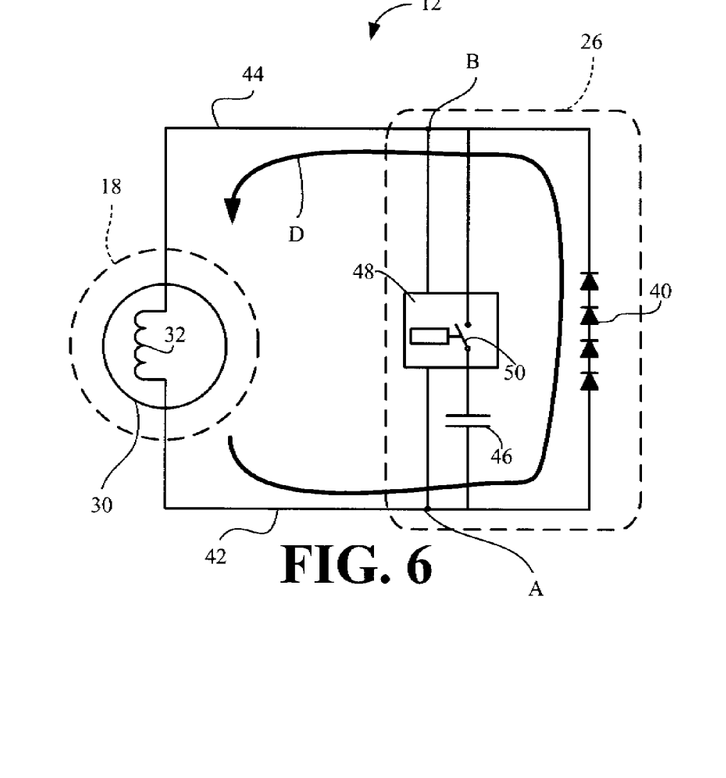
FIG. 6 is a schematic circuit diagram of the electric power device similar to FIGS. 2-5 showing the switch in the open position such that the charged coil of the dynamo powers the light-emitting diodes in accordance with the first embodiment of the present invention.

As shown in FIG. 4, direct current flows in a direction C from the power source 46. With the flow of direct current from the power source 46, the coil 32 in the dynamo 30 is charged. Specifically, the direct current to the dynamo 30 causes a magnetic field to generate in the coil 32. Since the coil 32 is a series of windings similar to an electro-magnet, a magnetic field is generated in a manner similar to an electric magnet. Once the coil 32 of the dynamo 30 is charged, the voltage detection circuit 48 disconnects the source of direct current by opening the switch 50, as indicated in FIG. 5. With the switch 50 open and the coil 32 of the dynamo 30 charged, the coil 32 provides voltage to the diodes 40 as indicated in FIG. 6. More specifically, the flow of voltage from the collapsing magnetic field in the coil 32 is represented by the arrow D in FIG. 6.

Once the switch 50 is opened, the diodes 40 (the electrical device) is solely powered by the direct current voltage from the collapsing magnetic field of the coil 32 of the dynamo 30. Consequently, the front light 26 can provide light without direct power from the power source 46, but instead is powered by the voltage dissipating from the coil 32 of the dynamo 30.

One benefit of the configuration of the electric power device 12 of the present invention is that a low voltage power source such as the power source 46 can charge the coil 32 to create the magnetic field. However, since the coil 32 includes a series of windings that generate a magnetic field, induction between the windings increases the voltage provided by the collapsing magnetic field to power the diodes 40 (compared to the input voltage from the power source 46. The voltage from the collapsing magnetic field is a second voltage of the electric power assembly 12 and is greater than 12 volts. The diodes 40 require approximately 12 volts to illuminate. Therefore, the second voltage is sufficient to light the diodes 40.

The power source 46 is controlled by the voltage detection circuit 48 which detects the voltage differential between an input of the dynamo 30 and an output of the dynamo 30. The voltage detection circuit 48 is programmed or has circuitry designed to control the opening and closing of the switch 50 in response to prescribed detected levels of voltage differential between the lines 42 and 44.

Figure 7:
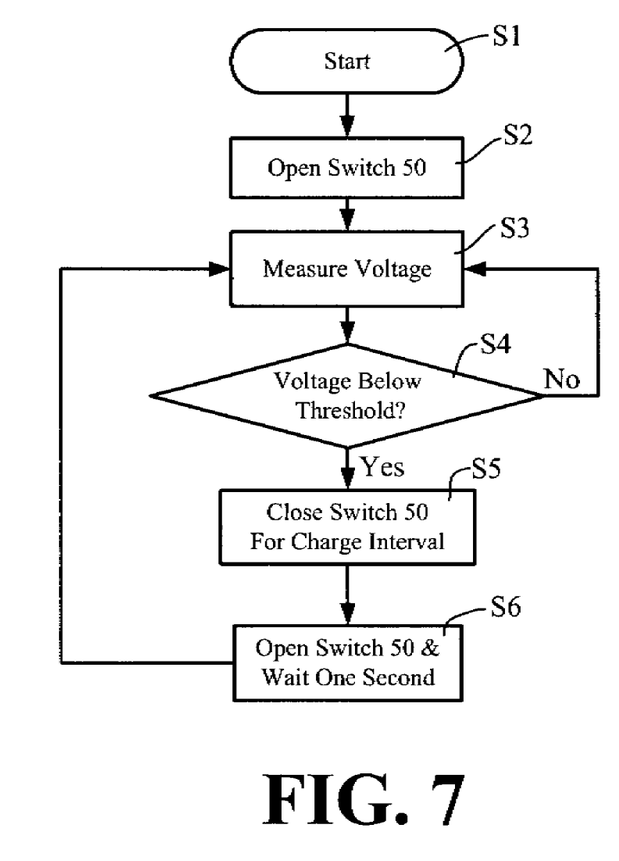
FIG. 7 is a flowchart outlining the operational steps of the voltage detection circuit in accordance with the first embodiment of the present invention.

As shown in FIG. 7, the voltage detection circuit 48 operates as follows. At step S1, the voltage detection circuit 48 starts in the presence of electric power. For example, the electric power can be provided by a separate internal battery (not shown) and corresponding switch (not shown), or by the electric potential between points A and B in the lines 42 and 44. The initial source of power can be provided from the dynamo 30 as the front wheel 16 rotates. This initial power from the dynamo 30 can be used to charge the power source 46 because the switch 50 is initially in a closed orientation and does not open until the voltage detection circuit 48 begins to operate.

Once the voltage detection circuit 48 is provided with power, the switch 50 is opened as indicated at step S2. The conditions at step S2 are also indicated in FIG. 2. Next, the voltage between points A and B in the lines 42 and 44 is measured, as indicated at Step S3 in FIG. 7. The results of the voltage detection in step S3 are compared in step S4. Specifically in step S4, if the voltage potential between A and B is above a predetermined voltage level (indicating power outputted from the dynamo 30 due to rotation of the front wheel 16) then the voltage detection step S3 is repeated.

In step S4, if the voltage between points A and B falls below the predetermined voltage level (indicating that the bicycle 10 has stopped), then the switch 50 is closed, as indicated at step S5 in FIG. 7. The conditions at step S5 correspond to the depiction in FIG. 3 of the present invention. With the switch 50 closed, electricity at a low voltage is provided from the power source 46 to the coil 32 of the dynamo 30 as indicated in FIG. 4 by the arrow C. The switch 50 is closed for a time interval sufficient to charge the coil 32. As a result, a magnetic field forms in the coil 32. The charge interval is a period of time required to charge the coil 32 (form the magnetic field) and is determined based upon the configuration of the electric power assembly 12. The charge interval can vary depending upon the specific configuration of the diodes 40, the potential of the power source 46 and response of the coil 32 of the dynamo 30. In the depicted embodiment, the charge interval is between 20 and 30 milliseconds.

At step S6, the switch 50 is opened. The voltage detection circuit 48 is configured to keep the switch 50 open for at least one second. FIG. 5 shows the switch 50 in the open orientation. With the opening of the switch 50, the magnetic field in the coil 32 begins to collapse producing the second voltage and corresponding flow of current D (shown in FIG. 6) illuminating the diodes 40.

The process depicted in FIG. 7 repeats itself causing the light-emitting diodes 40 to blink approximately once every second until the energy stored in the power source 46 is depleted. Specifically, at step S8, when the switch 50 is opened, the magnetic field formed in the coil 32 collapses causing current to flow and providing power to the light-emitting diodes 40. The depicted embodiment is such that the power source 46 can cause the diodes 40 to blink for approximately 5 minutes.

Also, the process in FIG. 7 will repeat itself until the bicycle 10 begins moving again and the dynamo 30 produces current in a conventional manner. Specifically, the voltage in the electric power assembly 12 will increase when the front wheel 16 begins to rotate. The voltage between points A and B will then increase such that the switch 50 remains open due to the operations in steps S3 and S4 repeating.

If the power source 46 becomes completely discharged and the bicycle 10 is at rest (not in motion), the switch 50 will default to a closed orientation. Once the front wheel 16 begins to rotate and the dynamo 30 produces electricity, the power source 46 is recharged.

In the first embodiment, the power source 46 is a 1 Farad capacitor or series of capacitors connected together to form a short term battery. In the first embodiment, when the power source 46 is fully charged by rotation of the front wheel 16 (charged by electricity produced by the dynamo 30), the power source 46 can output approximately 2.3 volts (the first voltage). When the front wheel 16 stops rotating (no power produced by the dynamo 30) and the switch 50 is closed, the power source 46 charges the coil 32 in approximately 20-30 milliseconds at approximately 2.3 volts. Once the switch 50 is opened, the magnetic field in the coil 32 collapses in 3-4 milliseconds but produces a spike in voltage (the second voltage which is greater than 12 volts).

The second voltage outputted by the coil 32 only lasts for a several milliseconds but provides sufficient voltage to illuminate the diodes 40. In other words, the diodes 40 blink. The second voltage being greater than 12 volts is sufficient to light four diodes 40. The voltage detection circuit 48 keeps the switch 50 open in step S6 for approximately one second before allowing the process depicted in FIG. 7 to repeat. Therefore, the diodes 40 can blink approximately once a second for up to five minutes (the approximate time it takes to discharge the power source 46).

Second Embodiment

Figure 8:
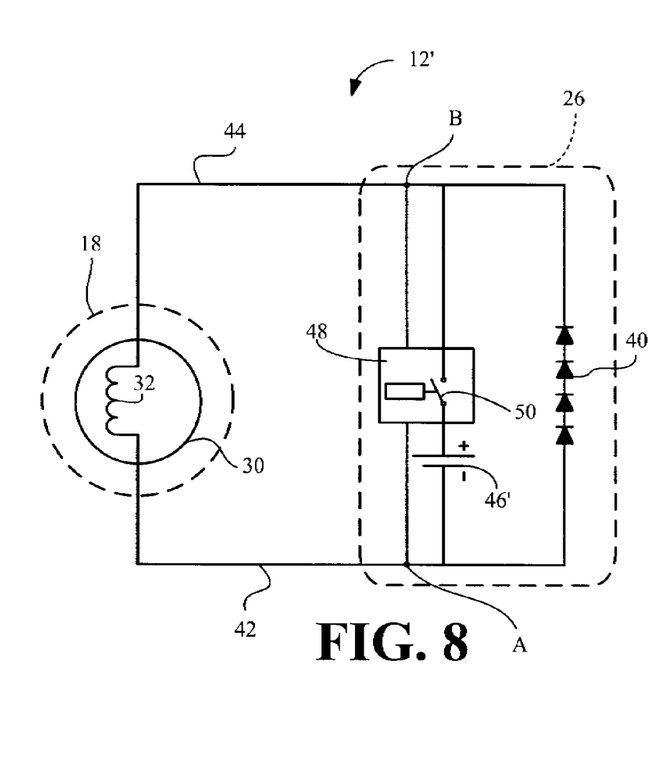
FIG. 8 is a schematic circuit diagram of the electric power device that includes a dynamo, a power source (a rechargeable battery), a voltage detection circuit, a switch and light-emitting diodes in accordance with a second embodiment of the present invention.

Referring now to FIG. 8, an electric power device 12' in accordance with a second embodiment is depicted. The electric power device 12' is identical to the electric power device 12 of the first embodiment element by element except that the power source 46 has been replaced with a power source 46'. The power source 46' is a conventional chemical driven rechargeable battery that has a typical output of approximately 1.2 volts. The output of the power source 46' is lower than the output of the power source 46' of the first embodiment. Therefore, the first voltage of the second embodiment is lower than the first voltage of the first embodiment. However, the output of the power source 46' is sufficient so that the electric power device 12' operates in the same manner as the electric power device 12 of the first embodiment. The charge interval of the coil 32 (step S5 in FIG. 7) required to form the magnetic field increases slightly compared to the first embodiment due to the lower voltage of the power source 46'. Otherwise structure operation of the second embodiment is the same as the first embodiment.

Third Embodiment

Figure 9:
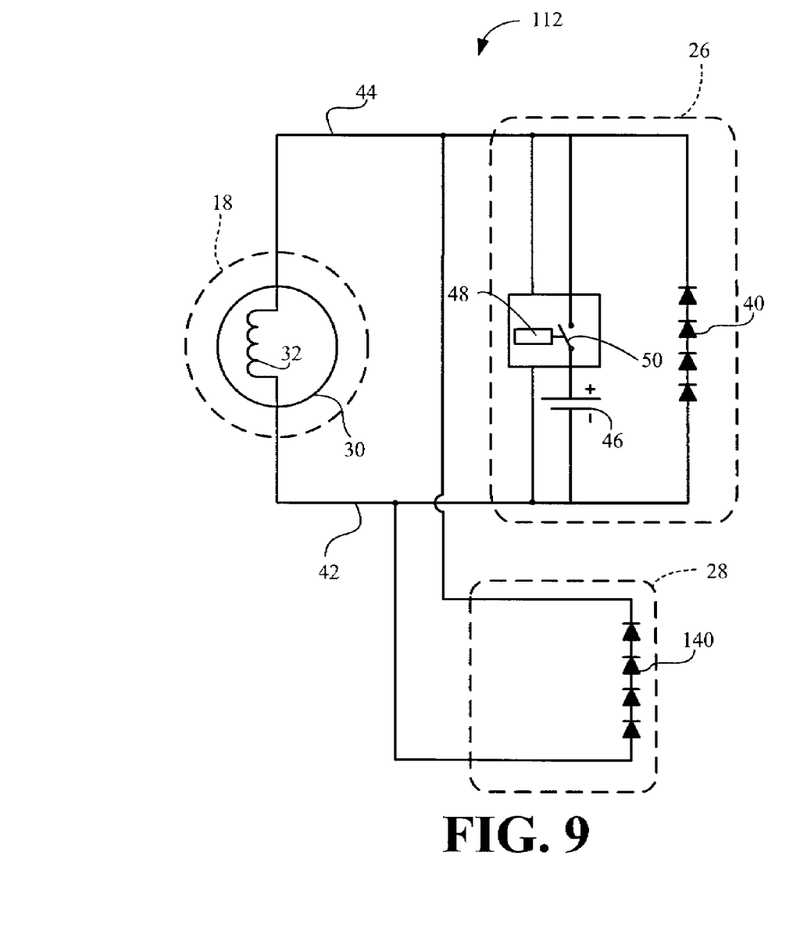
FIG. 9 is a schematic circuit diagram of an electric power device that includes two sets of light-emitting diodes in accordance with a third embodiment of the present invention.

Referring now to FIG. 9, an electric power device 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The electric power device 112 includes all the elements of the electric power device 12 of the first embodiment except the electric power device 112 also includes the rear light 28. The rear light 28 and the front light 26 are both powered by the electric power device 112. Specifically, the rear light 28 includes a plurality of light-emitting diodes 140 that are electrically connected to the lines 42 and 44 in parallel with the diodes 40 of the front light 26. Operation of the voltage detection circuit 48 and the dynamo 30 are the same as described above in the first embodiment.

Fourth Embodiment

Figure 10:
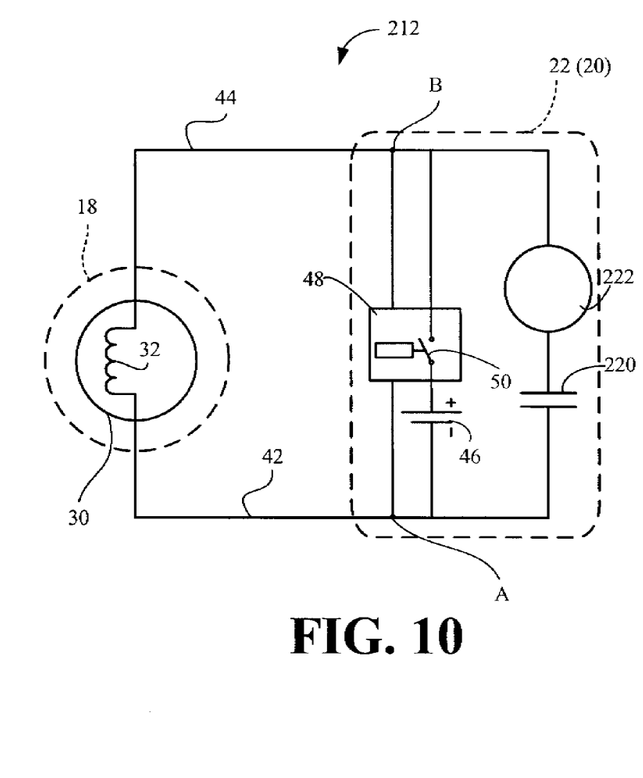
FIG. 10 is a schematic circuit diagram of an electric power device that includes a capacitor and a motor in accordance with a fourth embodiment of the present invention.

Referring now to FIG. 10, an electric power device 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The electric power device 212 includes the rear derailleur 22 as a bicycle electrical device. More specifically, the battery 46, the voltage detection circuit 48 and the switch 50 are integrated into the rear derailleur 22. In other words, all the components of the electric power device 12 of the first embodiment are included in the rear derailleur 22 except that the diodes 40 have been replaced by a capacitor 220 and a motor 222.

The motor 222 and capacitor 220 are electrically connected in series to the lines 42 and 44. The motor 222 is, for example, a gear shifting motor that provides power assistance to the rear derailleur 22 in the movement of the chain C between chain rings.

In the fourth embodiment, with the bicycle 10 stopped, the dynamo 30 produces no voltage from rotation of the front wheel 16. However, once the voltage detection circuit 48 closes the switch 50, the coil 32 is charged. Thereafter, the voltage from the coil 32 is used to charge the capacitor 220. The charge stored in the capacitor 220 can then be used to operate the motor 222. Operation of the voltage detection circuit 48 and the dynamo 30 are the same as described above in the first embodiment.

Alternatively, the motor 222 can be located in the front derailleur 20.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle electric power device comprising:
    a bicycle dynamo;
    a bicycle electrical device electrically connected to the dynamo;
    a power source electrically connected to the dynamo in parallel with the electrical device and configured to chargeably connect to the dynamo; and
    a switch connected in series with the power source and configured to controllably connect the power source to the dynamo with the dynamo producing no power of its own such that with the switch closed the dynamo is charged by the power source and with the switch opened the dynamo provides boosted voltage to the bicycle electrical device.

2. The bicycle electric power device according to claim 1, wherein the bicycle electrical device is a bicycle light.

3. The bicycle electric power device according to claim 2, wherein the bicycle light includes a plurality of light-emitting diodes.

4. The bicycle electric power device according to claim 3, wherein the light-emitting diodes are arranged in series.

5. The bicycle electric power device according to claim 1, wherein the bicycle electrical device includes a capacitor.

6. The bicycle electric power device according to claim 1, wherein the bicycle electrical device includes a gear shifting motor.

7. The bicycle electric power device according to claim 1, further comprising:
    a control circuit configured to open and close the switch in response to prescribed voltage levels detected between a first side of the dynamo and a second side of the dynamo.

8. The bicycle electric power device according to claim 1, wherein the power source is a battery.

9. The bicycle electric power device according to claim 1, wherein the power source is a capacitor.

10. The bicycle electric power device according to claim 1, further comprising:
    a second electrical device electrically connected to the dynamo in parallel with the electrical device.

11. The bicycle electric power device according to claim 10, wherein the electrical device and the second electrical device each include a plurality of light-emitting diodes.

12. The bicycle electric power device according to claim 1, wherein the dynamo is coupled to a bicycle and is configured to provide electric power to the electrical device with the bicycle in motion.

* * * * *